(12) United States Patent
Glas et al.

(10) Patent No.: US 12,445,479 B2
(45) Date of Patent: Oct. 14, 2025

(54) TESTING SOFTWARE AND IT PRODUCTS BY EVALUATING SECURITY MATURITY AND RISK OF CHANGE

(71) Applicant: Center for Internet Security, Inc., East Greenbush, NY (US)

(72) Inventors: Brian Joseph Glas, Jackson, TX (US); John Dzuirlaj, Akron, OH (US); Michael Erik Garcia, Washington, DC (US); Philippe Langlois, Clifton Park, NY (US); Jared Kelley Marcotte, Silver Spring, MD (US); Katharina Elizabeth Owens Hubler, Park City, UT (US); Aaron Wilson, Jacksonville, FL (US)

(73) Assignee: Center for Internet Security, Inc., East Greenbush, NY (US)

( * ) Notice: Subject to any disclaimer, the term of this patent is extended or adjusted under 35 U.S.C. 154(b) by 88 days.

(21) Appl. No.: 18/440,590

(22) Filed: Feb. 13, 2024

(65) Prior Publication Data

US 2024/0275809 A1    Aug. 15, 2024

Related U.S. Application Data

(60) Provisional application No. 63/445,250, filed on Feb. 13, 2023.

(51) Int. Cl.
*H04L 9/40*    (2022.01)
*G06N 20/00*    (2019.01)

(52) U.S. Cl.
CPC ........ *H04L 63/1433* (2013.01); *G06N 20/00* (2019.01); *H04L 63/1416* (2013.01)

(58) Field of Classification Search
CPC .. H04L 63/1433; H04L 63/1416; G06N 20/00
See application file for complete search history.

(56) References Cited

U.S. PATENT DOCUMENTS

| 12,143,412 B2 * | 11/2024 | Mullaney | G06N 20/00 |
| 2017/0091078 A1 * | 3/2017 | Atyam | G06F 11/3616 |
| 2019/0238582 A1 * | 8/2019 | Sauve | H04L 63/1433 |

(Continued)

*Primary Examiner* — Jonathan A Bui
(74) *Attorney, Agent, or Firm* — Schmeiser, Olsen & Watts LLP

(57) ABSTRACT

Systems and methods for testing, evaluating, and scoring IT products (e.g., software) and product updates from a technology provider are disclosed herein. More specifically, organizational assessment may be performed to evaluate the provider's development lifecycle processes and generate organization maturity scores. Architecture assessment may be performed to evaluate the system-level and software-level architectures associated with the application and generate architecture maturity scores. Product verification may be performed via automated testing and penetration testing to generate verification maturity scores. The organization maturity scores, architecture maturity scores, and verification maturity scores may be used to provide recommendations to the provider and also combined into an overall maturity score, which may serve as a comprehensive summary of the evaluation. These generated scores inform and expedite testing of future iterations of the product.

18 Claims, 12 Drawing Sheets

(56) References Cited

U.S. PATENT DOCUMENTS

| | | | |
|---|---|---|---|
| 2020/0134195 A1* | 4/2020 | Youngberg | G06F 21/577 |
| 2020/0364345 A1* | 11/2020 | Hecht | G06F 21/577 |
| 2022/0129561 A1* | 4/2022 | Shivanna | G06F 16/951 |
| 2022/0164175 A1* | 5/2022 | Masis | G06F 3/0484 |
| 2022/0377098 A1* | 11/2022 | Singh | H04L 63/1433 |
| 2022/0405397 A1* | 12/2022 | Golan | G06F 21/57 |
| 2023/0004651 A1* | 1/2023 | Bosch | G06F 9/54 |
| 2023/0017316 A1* | 1/2023 | Kulkarni | G06N 5/04 |
| 2023/0196020 A1* | 6/2023 | Thoniparambil | G06F 40/35 704/9 |
| 2023/0319098 A1* | 10/2023 | Berlin | G06N 5/022 726/24 |

\* cited by examiner

800 ↘

| Security Control Family | SubTotal |
|---|---|
| Authentication | 1.30 |
| Authorization | 0.78 |
| Boundary Protection | 1.99 |
| Data Confidentiality and Integrity | 1.08 |
| Injection Prevention | 1.08 |
| Logging Alerting | 2.04 |
| Secret Management | 1.39 |
| System Availability | 2.34 |
| System Integrity | 1.38 |
| User Session | 1.38 |
| Overall | 1.47 |

802 — Security Control Family column
804 — SubTotal column
806 — Overall row

*FIG. 8*

TESTING SOFTWARE AND IT PRODUCTS BY EVALUATING SECURITY MATURITY AND RISK OF CHANGE

CROSS-REFERENCE TO RELATED APPLICATIONS

This application claims the benefit of U.S. Provisional Patent Application No. 63/445,250, entitled "METHOD FOR TESTING SOFTWARE PRODUCTS," filed Feb. 13, 2023, the contents of which are incorporated by reference herein in their entirety.

Any and all applications for which a foreign or domestic priority claim is identified in the Application Data Sheet as filed with the present application are hereby incorporated by reference under 37 CFR 1.57.

TECHNICAL FIELD

The embodiments of the disclosure generally relate to the testing and assessment of software and information technology (IT) products, including a process for using the measured maturity of organizational characteristics and technology product architecture as a proxy of risk to determine security and other testing needs.

BACKGROUND

Independent testing of information technology traditionally involves a full retest of the product with any change. More modern instantiations use various proxies to scale down the extent of retesting to save time and reduce cost. These approaches each have significant limitations.

A relevant, common type of testing includes manual testing, which involves human intervention to test the software. This is prone to human error. It is expensive, time-consuming, and requires extensive knowledge of possible inputs and outputs. Another common type of testing is automated testing, which leverages test scripts. Automated testing can conduct complex testing rapidly, but it lacks the flexibility and creativity to find novel concerns. Another common type of testing is unit testing, which limits testing to a smaller part of the product and does not account well for interdependencies. Another common type of testing is integration testing, which addresses interactions between parts of a product. Integration testing can be expensive and time consuming, and is generally more equipped to find failures rather than vulnerabilities. Another common type of testing is end-to-end testing, which is well-equipped to test functionality of intended flows. However, end-to-end testing is expensive when used for an entire system and ill-equipped for identifying threats. Another common type of testing is acceptancy testing, which is focused on satisfaction of business requirements. Another common type of testing is performance testing, which is focused on operation under a specific workload. Another common type of testing is dependency testing, which looks for changes in the expected state of existing aspects of a product or dependent product when a new portion of the product is established. Dependency testing requires a difficult-to-achieve knowledge of all potential state changes.

With each of these types of testing, the fundamental issue remains the same: some can be used in a scaled manner to limit testing to areas impacted by a change, but they do not assist in establishing what might be impacted by the change. Some integration tests and automated tools can detect where changes occurred, but they are not designed to establish where in a product one is likely to find unexpected consequences outside of the areas of those changes.

Previous approaches to determining, a priori, the riskiness of any given change and scale the level of testing appropriately have been crude. For example, one approach includes assessing the number of lines of code changed and setting thresholds (often arbitrarily) at which more significant testing is triggered. Another approach assesses some changes as de minimis-changing the color scheme in a graphical user interface or altering the formatting of an output. Sometimes this is trifurcated into major, minor, and de minimis changes. This considers the risk of the change but not the risk of the environment in which change is made. This also gives incentive to recategorize the risk of changes to ease the burden of testing; the more types of changes you consider de minimis or minor, the faster and easier is the testing in the long run. Other approaches work in opposition to the ability to manage risk: a more mature organization is more likely to conduct thorough testing, despite it having controls in the development process that reduce the risk of unintended consequences.

To add complexity to the problem, mission criticality can impact the type of change: less critical systems require less testing, more critical require more significant testing. Currently, there is no testing process by which all three of the following important aspects of risk are considered: 1) the risk of the change itself as inherent in the type of change itself, 2) the risk associated with the development environment of the product and the product's own construction, and 3) the risk environment in which the product operates. Accordingly, there is a need in the industry to be able to rapidly test and evaluate software applications based on risk. Described herein are systems and methods for testing and evaluating IT products (e.g., software applications), which are able to measure the maturity of organizational processes, system and software architecture, and implementation to determine the maturity of the IT product and the risk of change based on that maturity, so a tailored test plan can be developed to improve efficiencies of the next iteration.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

Embodiments of the inventions described herein can comprise several novel features and no single feature is solely responsible for the desirable attributes or is essential to practicing the inventions described.

To better understand the maturity and associated risk of different types of changes to software, systems and methods are disclosed herein that will evaluate the maturity of organizational processes, the system and software architecture, and the final implementation. The output of the system will be a set of maturity scores that will enable risk-based decision-making related to changes in an IT product or software system.

Systems and methods are disclosed herein for testing, evaluating, and scoring an IT product (e.g., a software application) of a technology provider. In some embodiments, steps involved may include: receiving a submission package from the technology provider, wherein the submission package comprises an artifact associated with development of the IT product; processing a set of organizational interview transcripts containing discussions of development lifecycle processes; generating a set of organizational maturity scores based on the set of organizational interview transcripts and the artifact; processing a full architectural model comprising system-level components and software-level components associated with the IT product; generating a set of architecture maturity scores based on the full architectural model; performing manual or automated testing of the IT product; performing penetration testing of the IT product; generating a set of verification maturity scores based on the penetration testing; and combining the set of organizational maturity scores, the set of architecture maturity scores, and the set of verification maturity scores into an overall maturity score.

In some embodiments, the steps involved may further include assessing risk associated with the IT product based on the set of organizational maturity scores, the set of architecture maturity scores, the set of verification maturity scores, and the overall maturity score. In some embodiments, the set of organizational maturity scores, the set of architecture maturity scores, the set of verification maturity scores, and the overall maturity score are used to inform and expedite testing of future iterations of the IT product. In some embodiments, the set of organizational maturity scores are generated by a machine learning model. In some embodiments, the set of architecture maturity scores are generated by a machine learning model. In some embodiments, the set of verification maturity scores are generated by a machine learning model.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIG. 8 illustrates multi-layer scoring associated with the overall architecture maturity score, in accordance with embodiments of the present application.

DETAILED DESCRIPTION

Figure 1:
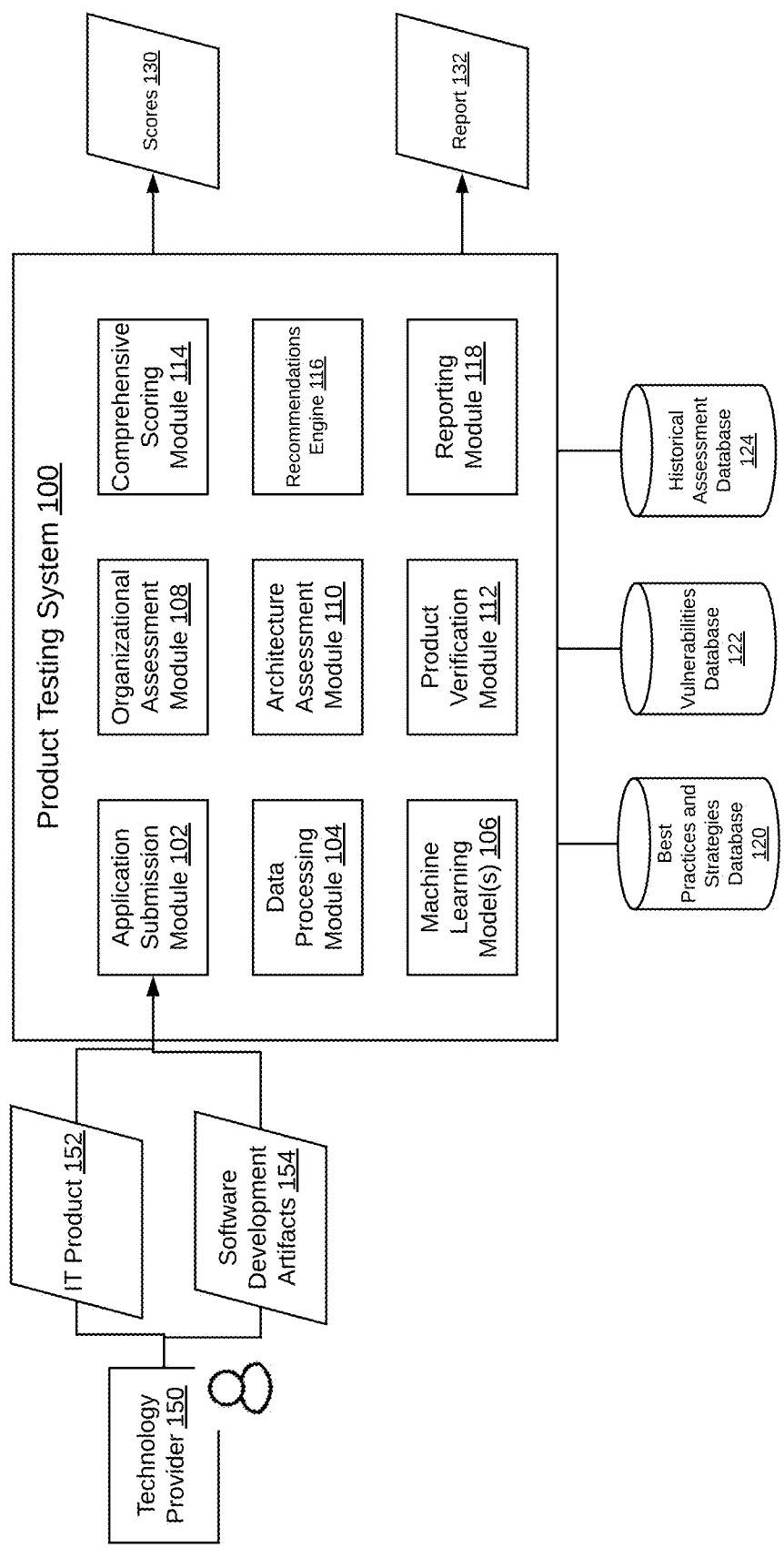
FIG. 1 is a block diagram of a software testing system, in accordance with embodiments of the present application.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

As referred to herein, the term "provider," "technology provider," "software provider," or "organization" may refer to any entity or organization that is submitting an IT product for testing and evaluation using the systems and methods disclosed herein.

As referred to herein, the term "IT product," or "product" may refer to any software-based IT product (e.g., a software application), the updated IT product (e.g., new versions of a previously-evaluated IT product), or update to the IT product (e.g., a patch for the IT product), which is submitted by a provider for evaluation by the product testing systems and methods described herein.

As referred to herein, the term "artifact" may refer to any kind of tangible by-product (e.g., documentation, diagrams, data models, etc.) produced during the development of software. Some artifacts (e.g., use cases, class diagrams, and other Unified Modeling Language (UML) models, requirements, and design documents) help describe the function, architecture, and design of software. Other artifacts are concerned with the process of development itself-such as project plans, business cases, and risk assessments.

As referred to herein, the term "organizational assessment," "organization assessment," or "process assessment" may refer to one of the subprocesses described herein that is involved in testing and evaluating the provider of an IT product submission. This subprocess is described in connection with FIG. 3.

As referred to herein, the term "architecture assessment," or "architectural assessment" may refer to one of the subprocesses described herein that is involved in testing and evaluating the architecture of a submitted IT product. This subprocess is described in connection with FIG. 6.

As referred to herein, the term "software verification," "product verification," or "product testing" may refer to one of the subprocesses described herein that is involved in testing and evaluating the implementation of a submitted IT product. This subprocess is described in connection with FIG. 9.

The terms "organizational maturity" and "organization maturity" are used interchangeably herein. The terms "architectural maturity" and "architecture maturity" are used interchangeably herein.

It should be understood that the various steps described in these methods may be performed in different orders than the ones presented, and that certain steps may be optionally performed.

FIG. 1 is a block diagram of a product testing system 100, in accordance with embodiments of the present application.

In some embodiments, the product testing system 100 may have one or more components, including an application submission module 102, a data processing module 104, one or more machine learning models 106, an organizational assessment module 108, an architecture assessment module 110, a product verification module 112, a comprehensive scoring module 114, a recommendations engine 116, and a reporting module 118. In some embodiments, the product testing system 100 may include or be in communication with one or more data stores, such as a best practices and strategies database 120, a vulnerabilities database 122, and/or a historical assessment database 124.

In some embodiments, a technology provider 150 that desires to have their software tested and evaluated by the product testing system 100 may submit their IT product 152 (or an update/patch to the IT product 152) and any software development artifacts 154 in their possession to the product testing system 100. Examples of an IT product 152 may include a software application or an update to a software application (e.g., a new version of the software application, a patch for updating the software application, etc.). The software development artifacts 154 may be any tangible by-products produced during development of IT product 152, such as any design or planning documentation that describe the function, architecture, and design of the IT product 152.

In some embodiments, the product testing system 100 may have an application submission module 102 that may handle collection of any submissions by the provider 150. For example, the application submission module 102 may provide a portal or user interface that enables a person associated with the provider 150 (e.g., an employee) to upload and submit the IT product 152 and any software development artifacts 154 to be considered.

In some embodiments, the product testing system 100 may have a data processing module 104 for collecting and pre-processing any input data for use by the product testing system 100. For example, in some embodiments, the product testing system 100 may perform analysis based on transcriptions of conversations from interviews or meetings, and the data processing module 104 may clean up the transcriptions (e.g., correct any misspellings) and/or convert them into an appropriate data format for use.

In some embodiments, the product testing system 100 may have an organizational assessment module 108, an architecture assessment module 110, and/or a product verification module 112 that respectively handle the three subprocesses of organizational assessment, architecture assessment, and product verification. For example, the organizational assessment module 108 may handle one or more of the steps described in FIG. 3, such as the generation of organization maturity scores (e.g., block 308); the architecture assessment module 110 may handle one or more of the steps described in FIG. 6, such as the generation of a full architecture model or architecture maturity scores (e.g., blocks 616/618); and the product verification module 112 may handle one or more of the steps described in FIG. 9, such as the generation of verification maturity scores (e.g., block 910).

In some embodiments, the product testing system 100 may have a comprehensive scoring module 114. The comprehensive scoring module 114 may collect, process, and/or integrate the scores generated from the organizational assessment, architecture assessment, and product verification subprocesses. The comprehensive scoring module 114 may generate a comprehensive, overall maturity score based on the results obtained from the organizational assessment, architecture assessment, and product verification subprocesses. For example, the comprehensive scoring module 114 may combine the organization maturity scores, the architecture maturity scores, and the verification maturity scores into an overall maturity score. In some embodiments, one or more of the scores generated over the course of testing and evaluating the software application 152 (e.g., the overall maturity score, the organization maturity scores, the architecture maturity scores, the verification maturity scores, etc.) may be output as scores 130 that are viewable by the provider 150, which can utilize the scores to assess weaknesses or risks associated with different aspects of their software application 152.

In some embodiments, the product testing system 100 may include one or more machine learning models 106. In some embodiments, the organizational assessment module 108, the architecture assessment module 110, the product verification module 112, and/or the comprehensive scoring module 114 may utilize the machine learning models 106 to perform analysis and/or generate scores. For instance, the organizational assessment module 108 may automatically utilize one of the machine learning models 106 to generate organization maturity scores based on questionnaire answers identified from analyzing interview transcripts.

In some embodiments, the product testing system 100 may be able to use various kinds of external information during analysis of the IT product 152. For example, the product testing system 100 may be able to reference a vulnerability database 122 to identify vulnerabilities in the IT product 152 (e.g., during software composition analysis performed by the architecture assessment module 110).

In some embodiments, the product testing system 100 may include a recommendations engine 116. The recommendations engine 116 may be able to generate actionable recommendations (e.g., a list of recommendations) based on any of the analysis or the results associated with the organizational assessment, architecture assessment, and product verification subprocesses. The generated recommendations may be provided to the provider 150 for review.

In some embodiments, the recommendations engine 116 may take into consideration multiple factors and/or sources of information to generate the recommendations. For example, in some embodiments, the recommendations engine 116 may generate recommendations by referencing a best practices and strategies database 120 associated with software security. The database 120 may contain best practices and strategies for many different aspects of software security processes, and the recommendations engine 116 may use it to map lacking aspects or areas of the IT product 152 to specific actionable recommendations. Additionally, in some embodiments, the recommendations engine 116 may be able to take into account the scores and specific feedback generated by any of the machine learning models 106. In some embodiments, the recommendations engine 116 may factor in the provider's current IT maturity gleaned from transcripts, along with historical data from other organizations besides the current provider 150.

In some embodiments, the recommendations engine 116 and any of the machine learning models 106 may be used together or integrated. For example, the recommendations engine 116 may be built on top of a machine learning model 106 for analyzing questionnaire responses. This can help the provider 150 improve their software security processes, assess their current software security maturity, and obtain a clear, customized roadmap for improvement. This proactive approach aids in developing more secure software, mitigating risks, and aligning with best practices in the rapidly evolving domain of cybersecurity.

In some embodiments, the recommendations generated by the recommendations engine 116 may be prioritized based on their potential impact and feasibility. This prioritization ensures that organizations can focus on the most critical areas first, making the best use of their resources. In some embodiments, the recommendations engine 116 may learn and improve over time, such as by refining its suggestions based on feedback and the outcomes of implemented recommendations. This adaptive approach ensures that the generated recommendations remain relevant and effective as the organization's security posture and the threat landscape evolve.

In some embodiments, the recommendations engine 116 may include or be associated with an interactive user interface (not shown) that can be accessed by anyone associated with the provider 150 (e.g., architects and developers of the IT product 152). For example, architects and developers of the IT product 152 may be able to use the user interface to engage with the product testing system 100 and review provided recommendations, understand the basis and reasoning for the recommendations, and submit feedback to further enhance the accuracy and relevance of the recommendations engine 116. The recommendations engine 116 may be designed to seamlessly integrate into existing software development workflows, promoting continuous architectural improvement.

In some embodiments, there may be a reporting module 118 for generating a report 132 based on the analysis and testing performed on the IT product 152. This report 132 may be provided to the provider 150 for review. In some embodiments, the report 132 may include any scores and/or recommendations generated by the product testing system 100 during the testing and evaluation process. In some embodiments, additional feedback may be generated and provided in the report 132 to indicate strengths, weaknesses, and opportunities for improvement.

In some embodiments, the product testing system 100 may have a historical assessment database 124, which can be used to store the results and analysis of any previous testing and evaluation of the IT product 152. Accordingly, testing and evaluation of the IT product 152 may be an ongoing, iterative process (e.g., performed for many different versions of the IT product 152). In some embodiments, the testing and evaluation of the IT product 152 may be adjusted or modified based on the results and analysis obtained from previous testing (e.g., stored in the historical assessment database 124). For example, if it had been determined from previous testing that a prior version of the IT product 152 had certain aspects that were considered to be at a high maturity level, then those aspects of the current IT product 152 may require less-rigorous testing by the product testing system 100.

Figure 2:
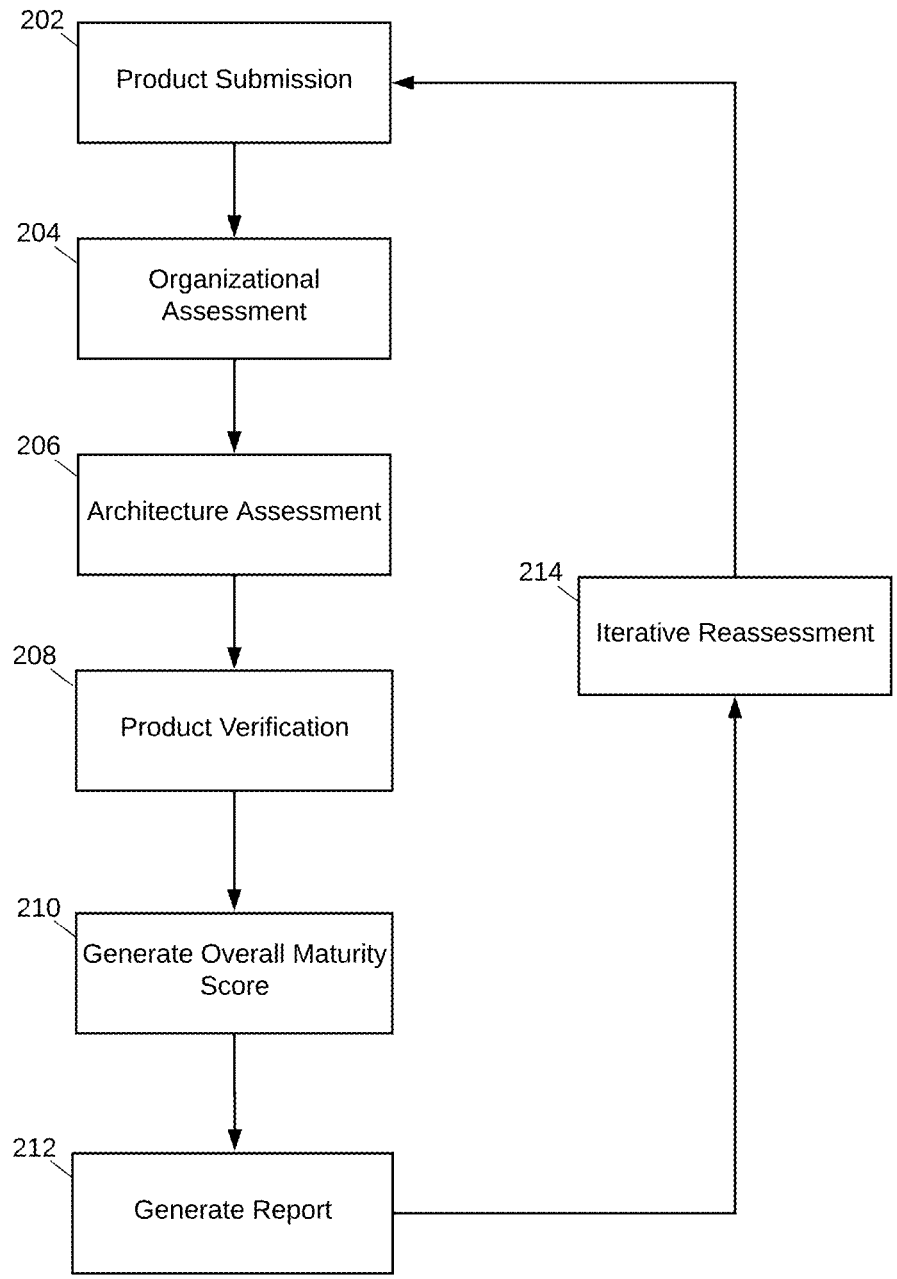
FIG. 2 is a flow chart illustrating an overview of a method for testing and evaluating a software application, in accordance with embodiments of the present application.

FIG. 2 is a flow chart illustrating an overview of a method for testing and evaluating an IT product, in accordance with embodiments of the present application.

More specifically, the method for testing and evaluating an IT product may involve three main subprocesses: (1) an organizational assessment; (2) an architecture assessment; and (3) product verification. Within each of these three main subprocesses, there is a specific methodology used to create a set of maturity scores associated with that subprocess. In some embodiments, the methodology may involve inputs from other process functions, as well as inputs from details of the organization and product. The analysis and results from each of these subprocesses may be used to determine the overall maturity and risk of the software application and/or to generate a detailed report of the assessment.

At block 202, a provider submits an IT product to obtain an initial scoping review, and is linked with testers.

At block 204, an organizational assessment is performed. During the organization assessment, the provider's product (e.g., software) development processes are analyzed to measurably determine their effectiveness at managing risks. In some embodiments, the organization assessment subprocess leverages a machine learning model for analyzing and scoring answers for an organizational maturity rubric questionnaire obtained from meeting transcriptions. The organizational assessment may result in a set of organization maturity scores being generated. More information about the organizational assessment is provided in connection with FIG. 3.

At block 206, an architecture assessment is performed. During the architecture assessment, the technology stack used to develop the IT product is analyzed to determine if the software is designed with modern techniques that lower the risk of successful attacks. The architecture assessment may result in a set of architecture maturity scores being generated. More information about the architecture assessment is provided in connection with FIG. 6.

At block 208, product verification is performed. The IT product is tested to determine whether it appropriately mitigates risk and meets the provider's claims regarding security, usability, accessibility, and so forth. The product verification may result in a set of verification maturity scores being generated. More information about the product verification subprocess is provided in connection with FIG. 9.

At block 210, an overall maturity score for the IT product may be generated. The overall maturity score may be a comprehensive score that reflects the maturity of many different aspects of the IT product. For example, the organization, architecture, and verification maturity scores may be used to establish the overall maturity score of the product. Accordingly, the overall maturity score would encapsulate the different aspects of the IT product that were assessed in the different subprocesses.

At block 212, reports may be generated based on the analysis and results of the three main subprocesses. In some embodiments, full reports for each of the three main subprocesses are generated. In some embodiments, based on results, the provider and the product version may be listed as verified. In some embodiments, the reports may be provided to the provider.

At block 214, there may be iterative assessment, meaning that the obtained scores and results may be leveraged for testing new versions of the same product in the future. Incremental testing can be conducted based on changes to any of the organizational assessment, architecture assessment, and product verification subprocesses. In other words, when a new version of the same product is tested in the future, the described processes and methodologies may be repeated more efficiently by leveraging prior iterations of testing the product.

Figure 3:
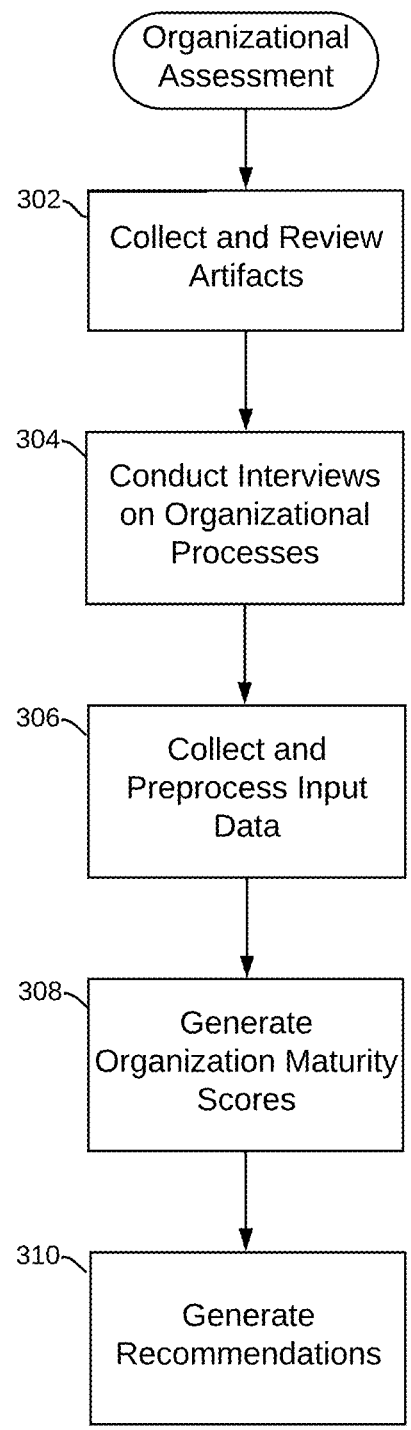
FIG. 3 is a flow chart illustrating a method for organizational assessment, one of the main subprocesses involved in testing and evaluating an IT product, in accordance with embodiments of the present application.

FIG. 3 shows a method of organizational assessment, one of the main subprocesses involved in testing and evaluating IT products, in accordance with embodiments of the present application.

The organizational assessment assesses the maturity of the technology provider's governance that a software system is built under, which can include the technology provider's software development lifecycle processes, security practices, policies and standards, training, metrics, and so forth. In some embodiments, organizational assessment may involve evaluating the maturity of the organizational processes through interviews, parsing transcripts of the interview, and analyzing the interview transcripts via a machine learning model. This may result in maturity scoring and model-based recommendations for improvements.

In some embodiments, the development lifecycle processes may include design processes, implementation processes, verification processes, operations processes, and/or assurance processes. For instance, the processes supporting the design of a software system may be assessed for, but not limited to: maturity in software design, threat modeling, security requirements, and software/supplier management. The implementation processes to be assessed may include, but are not limited to: defect management, secret management, and build and deployment integration. The verification processes to be assessed may include, but are not limited to; post implementation analysis of architecture, manual security testing, automated security testing, and penetration testing. The operations processes to be assessed may include, but are not limited to; incident response, lifecycle management, and patch management. In some embodiments, the software assurance processes that need to be assessed for maturity are beyond the traditional software development lifecycle processes, and include people, process, and technology from governance to operations. These processes taken together form the organizational maturity rubric.

In some embodiments, the organizational assessment may also take into account the human factors of accessibility and usability. Accessibility is often overlooked as a development priority, but it is an important one. For example, some software developers have developed repetitive stress injuries and turned to speech-to-text aids to continue working in their profession. Beyond the general necessity, adhering to accessibility standards is often a hard requirement for IT solutions in many state systems.

Usability testing and analysis helps bridge the gap between a solution that meets a set of requirements and a solution that meets the needs of the organization, people, and processes. Meeting usability objectives is the distinction between a solution that people want to use (i.e., meets a set of requirements and usability needs) versus one they do not (i.e., solely meets a set of requirements). Users will attempt to reduce friction in completing their desired task. A poorly designed user experience will result in users finding workarounds, often circumventing well-intentioned security controls. For a product to achieve the risk mitigation intended by its requirements, it must integrate usability principles with security controls and, thus, an organization's maturity in implementing usability is critical to its security outcomes.

In some embodiments, an organizational maturity rubric may be applied to generate organization maturity score(s). In some embodiments, the maturity model may use information collected about the provider's organization via interview-based discovery. In some embodiments, the maturity model may use information directly submitted by the provider. In some embodiments, the organizational maturity rubric may include usability and accessibility factors. For example, the organizational maturity rubric may use an additional human factors function and assess any practices in usability and accessibility adhered to during development.

In some embodiments, the maturity model may generate a set of organization maturity scores for different categories. In some embodiments, one or more of the organization maturity scores may be used later on in the architecture assessment subprocess to aid in scoring several dimensions. In some embodiments, one or more of the organization maturity scores may be used later on in the product verification subprocess to scope and scale required testing. In some embodiments, the set of organization maturity scores may be aggregated, with weighting, to generate an overall composite score (e.g., an overall organization maturity score). In some embodiments, the higher the overall organization maturity score, the more streamlined the testing of future versions of the IT product may be.

Turning now to the figure, at block 302, one or more artifacts (e.g., tangible by-products produced during the development of the provider's IT product) may be collected and reviewed. In some cases, an artifact may be submitted by the provider during the evaluation process. The organizational assessment may be used to help determine if the artifacts are accurate and consistently available for process iterations. If there are additional software development artifacts that are reliable and beneficial to streamlining the process, the provider may request those artifacts to be evaluated and the testing rules updated to account for the artifacts.

One example of an artifact may include a software change list. The change list may be the most important software development artifact used when performing product verification in a revision iteration. It is critical that the list is accurate, detailed, and complete. In some embodiments, the provider may submit automated change lists built from the central source code repository and reviewed by system architects and product owners. In some embodiments, the provider may submit manually-generated change lists. However, it may take longer to process and review manually-generated change lists than automated change lists. In either case, the approach used for building change lists will be discovered and sample change lists will be reviewed for accuracy and completeness. If the provider-submitted change list is determined to be reliable, the organizational assessment will use that change list and not generate its own. If the provider-submitted change list is not reliable, the organizational assessment may explore other ways to produce an accurate change list, which may take additional time and resources.

Another example of an artifact may include security configurations and security configuration assessment results (e.g., generated by automated configuration assessment tools). Security configurations are a major part of ensuring that systems contain properly implemented security controls, and using standard configuration guidance leads to consistent security outcomes. In some cases, automated configuration assessment tools can be used to ensure guidance is being followed for every release. In some embodiments, the assessor may determine if the provider is subscribed to configuration guidance and if they are using a reliable assessment tool. If so, the results of the assessment tool will be used during iterations of the organizational assessment to verify certain requirements. If this artifact is not present or reliable, the product verification subprocess may involve performing additional testing to verify secure configurations.

Another example of an artifact may include vulnerability assessment results (e.g., generated from automated vulnerability assessments and automated vulnerability scans). Automated vulnerability assessments involve checking system components for known vulnerabilities. These assessments primarily check third party components for known vulnerable versions of software. In some embodiments, reviewers will investigate the scope, frequency, and tooling used by the technology provider to determine if there is sufficient coverage and accuracy. If the provider is regularly performing automated vulnerability scans on the product networks and software, the assessor may deem it appropriate that those results be used during the product verification subprocess in lieu of performing new scans.

Another example of an artifact may include automated testing routines and results (e.g., associated with automated unit testing). Automated unit testing is a way to regression test large and complex applications efficiently. It takes significant investment on the part of the provider to build test suites that are robust and accurate. For providers that have invested in automated unit testing capability, the results of their internal testing may be used to partially satisfy a subset of the product verification. The organizational assessment will look at the coverage and depth of the current automated testing routines, as well as the provider's commitment to maintaining its test suites.

In some embodiments, the artifacts, in addition to interview transcripts, may serve as inputs to the maturity model (e.g., the ML model applied at block 308). Accordingly, the maturity model may be able to generate scores based on the contents of the artifacts. In some embodiments, the artifacts may directly inform/impact the interviews (e.g., conducted at block 304). For example, the interviewer may validate information from the artifacts and probe for more information where necessary. Accordingly, the contents of any artifacts may be indirectly embedded in the interview transcripts, and thus the artifacts may indirectly affect the scoring by the maturity model via the interview transcripts.

At block 304, one or more interviews may be performed for the purpose of describing the provider's product development lifecycle processes. In some embodiments, the interview sessions are not checklist-based and may be driven by an organizational maturity rubric. The interview sessions may include discussions on how processes and procedures are implemented and conducted throughout the organization. The interview sessions may include discussions based on a questionnaire. In some embodiments, the interviews may produce transcripts that can be saved for analysis.

At block 306, any input data for the maturity model may be collected and preprocessed. In some embodiments, the input data for the maturity model may include artifacts submitted by the provider and/or the interview transcripts for all the conducted interviews (e.g., during which a questionnaire is discussed). As a more specific example, the interview transcripts may be collected and preprocessed, such as by cleaning them for inconsistencies or converted into a usable data format.

At block 308, a software maturity model may be applied to the input data to generate one or more organization maturity scores. In some embodiments, the maturity model may generate a set of organization maturity scores (e.g., for different categories). In some embodiments, the set of organization maturity scores may be used to determine an overall organization maturity score.

In some embodiments, the maturity model may comprise a machine learning model. In some embodiments, the machine learning model may employ natural language processing (NLP) techniques to parse text, extract relevant information, and identify key phrases and context. In some embodiments, the machine learning model may be a large language model (LLM) based on transformer architecture. In some embodiments, the machine learning model may be able to go through the responses/answers to the questionnaire in the interview transcripts, identify key phrases and context in the answers that indicate specific processes implemented and actions taken, and then generate organization maturity scores based on those answers. In some embodiments, the machine learning model may generate a score for each "Security Practice" based on the answers provided to all the questions for the respective "Security Practice."

In some embodiments, the machine learning model may be trained using any suitable supervised learning approach, and the machine learning model may be trained on a dataset of known questionnaire responses. Various algorithms, like decision trees or neural networks, can be used to handle the textual data and learn patterns. The trained model may then be able to score new responses based on these learned patterns. The scoring algorithm and the scores generated by the trained model may be validated against manually scored responses for accuracy. In some embodiments, the machine learning model may be continually improved through a feedback loop that incorporates user feedback and regularly updates the model with new training data to maintain relevance and accuracy.

In some embodiments, the maturity model may be integrated into a system or platform for automated processing and scoring. In some embodiments, there may be a user interface for reviewing generated scores and implementing any potential score adjustments. Accordingly, the organizational assessment subprocess may provide consistent, time-efficient scoring of questionnaire responses, and it may be adaptable to the nuances of spoken language and serve to reduce biases.

At block 310, recommendations (e.g., a list of recommendations) may be generated based on the analysis, and the recommendations may be provided to the provider for review. In some embodiments, the recommendations may be generated based on the answers to the questions (e.g., from the interview transcripts) and/or the organization maturity scoring The recommendations may be a cross-section of industry best practices and guidelines related to the organizational maturity rubric with the goal of improving maturity scores over iterations which will reduce overall risk.

In some embodiments, a recommendations engine may generate the recommendations. In some embodiments, the recommendations engine may take into consideration multiple factors and/or sources of information to generate recommendations for the provider. For example, in some embodiments, the recommendations engine may be able to take into account the scores and specific feedback generated by the maturity model. In some embodiments, the recommendations engine may factor in the provider's current IT maturity gleaned from transcripts, along with historical data from other organizations besides the current provider.

In some embodiments, the recommendations engine may be able to leverage the insights gained from the scored responses to provide tailored recommendations to the provider for enhancing software security practices. In some embodiments, the recommendations engine may function by first analyzing the scores and specific feedback generated by the machine learning model. The recommendations engine may be able to identify areas where the provider's software security processes are lacking or have room for improvement based on the maturity model's criteria.

In some embodiments, the recommendations engine and the machine learning model may be used together or integrated. Building a recommendation engine on top of the machine learning model for analyzing questionnaire responses can help enable the provider to improve their software security processes. By integrating this recommendations engine with the machine learning model, providers may be able to assess their current software security maturity while also receiving a clear, customized roadmap for improvement. This proactive approach aids in developing more secure software, mitigating risks, and aligning with best practices in the rapidly evolving domain of cybersecurity.

In some embodiments, additional feedback may be generated and provided in the report to indicate strengths, weaknesses, and opportunities for improvement. Incremental updates to an organization's processes will be identified in interviews and updates related to the impacted areas.

In some embodiments, the recommendations engine may generate recommendations by referencing a database, such as a database of best practices and strategies associated with (but not limited to) software security. For example, the database may contain best practices and strategies for many different aspects of software security processes. In some embodiments, the recommendations engine may reference this database to map any identified areas (e.g., of the organization's software security processes that the model has identified to be lacking or needs improvement) to specific actionable recommendations. For instance, if an organization scores low in areas like threat modeling or incident response, the recommendations engine might suggest implementing more rigorous threat analysis protocols or conducting regular security drills.

In some embodiments, the recommendations generated by the recommendations engine may be prioritized based on their potential impact and feasibility. This prioritization ensures that organizations can focus on the most critical areas first, making the best use of their resources.

In some embodiments, the recommendations engine may learn and improve over time, such as by refining its suggestions based on feedback and the outcomes of implemented recommendations. This adaptive approach ensures that the generated recommendations remain relevant and effective as the organization's security posture and the threat landscape evolve.

Figure 4:
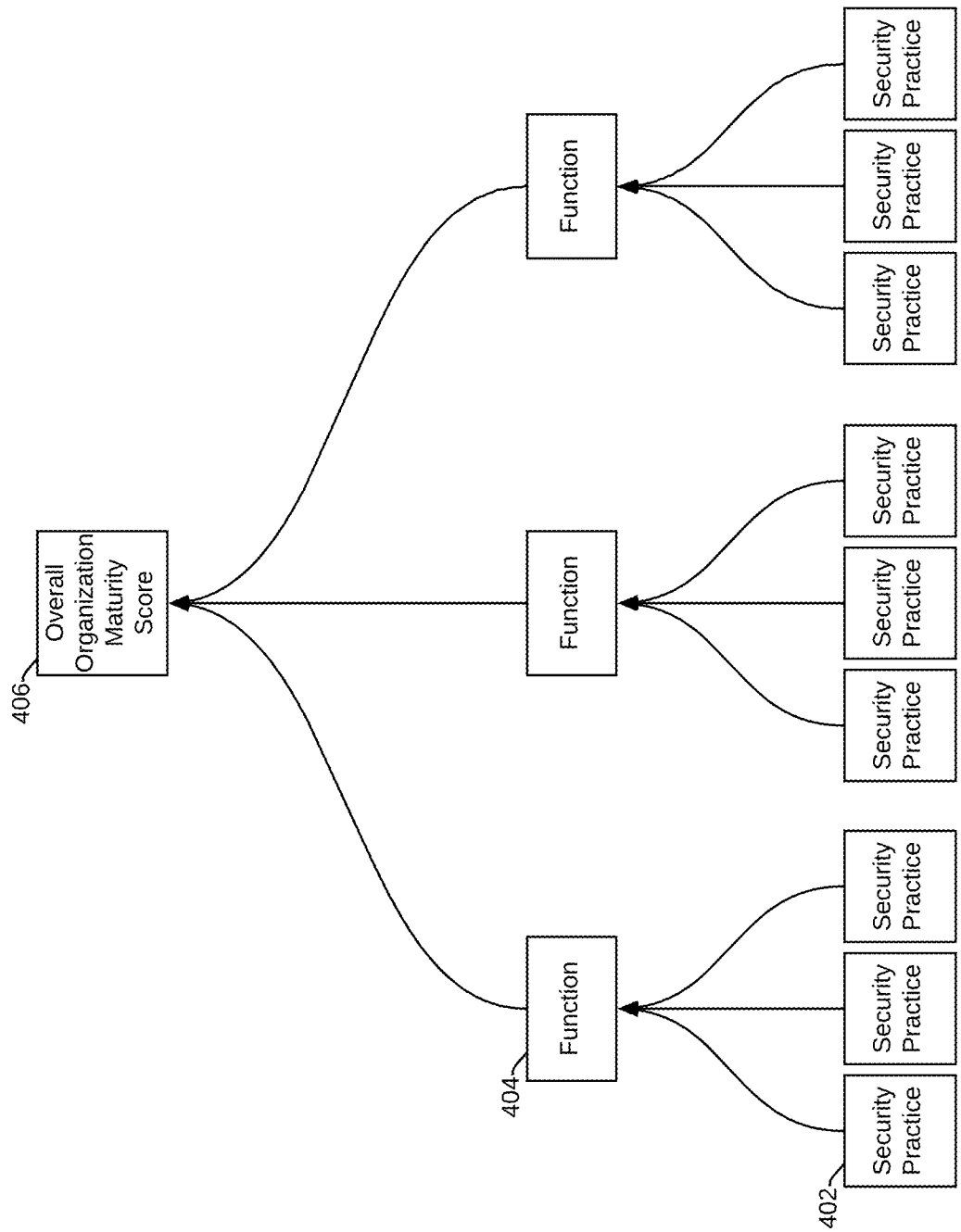
FIG. 4 illustrates multi-layer scoring associated with the overall organization maturity score, in accordance with embodiments of the present application.

FIG. 4 illustrates multi-layer scoring associated with the overall organization maturity score, in accordance with some embodiments of the present application.

In some embodiments, there may be various security practices 402 grouped into different functions 404. In some embodiments, the functions 404 may reflect the various categories of processes that fall under the provider's development lifecycle processes. For example, such categories may include governance, design, implementation, verification, operations, and/or human factors.

In some embodiments, each of the security practices 402 associated with a particular function 404 may be individually scored. The scores for those security practices 402 may then be combined into a score for the respective function 404. For example, the score for a function 404 may be a weighted average of the scores for the security practices 402 that fall under that function 404.

In some embodiments, the scores for the various functions 404 may be combined into a single overall organization maturity score 406. For example, the overall organization maturity score 406 may be a weighted average of the scores for the various functions 404.

Figure 5:
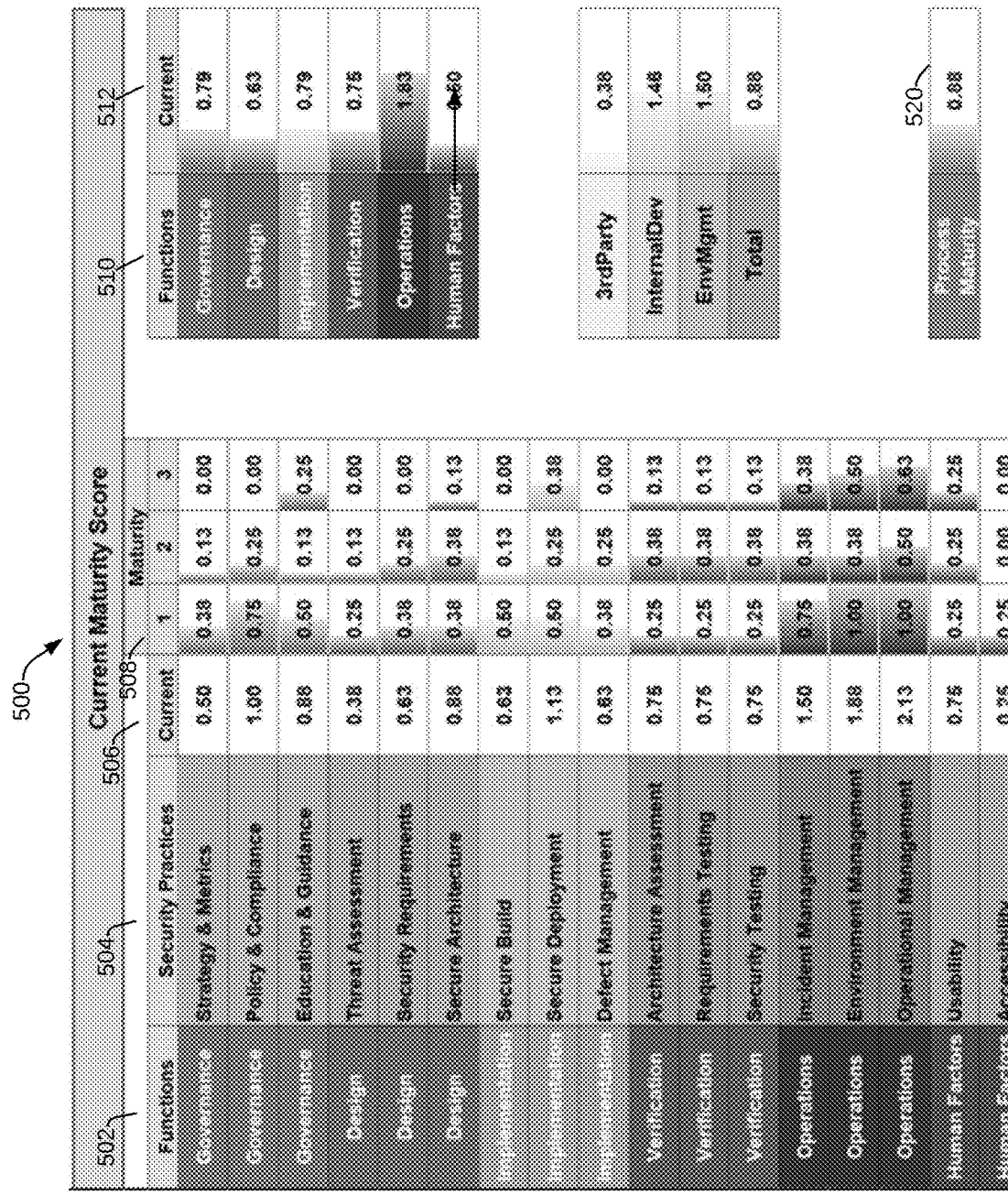
FIG. 5 illustrates multi-layer scoring associated with the overall organization maturity score, in accordance with embodiments of the present application.

FIG. 5 illustrates multi-layer scoring associated with the overall organization maturity score, in accordance with embodiments of the present application.

More specifically, an example scoring table 500 is shown that lists out the current individual scores 506 for each of the security practices 504. Also shown is the breakdown of the maturity score levels 508 that contribute to the overall score 506 for each of the security practices 504. The scoring table 500 also indicates the functions 502 that each of the security practices 504 fall under.

The example scoring table 500 also shows the scores 512 for each of the different functions 510, which may be obtained by combining the scores for the security practices associated with a particular function. For example, the security practices under the governance function include strategy & metrics, policy & compliance, and education & guidance—which have scores of 0.50, 1.00, and 0.88 respectively. Accordingly, those scores can be combined to obtain a score of 0.79 for the governance function.

The example scoring table 500 also shows the overall organization maturity score 520, which may be obtained by combining the scores 512 for all the various functions. For example, the functions include governance, design, implementation, verification, operations, and human factors—which have scores of 0.79, 0.63, 0.79, 0.75, 1.83, and 0.5 respectively. Accordingly, those scores can be combined to obtain a score of 0.88 for the overall organization maturity score 520.

Figure 6:
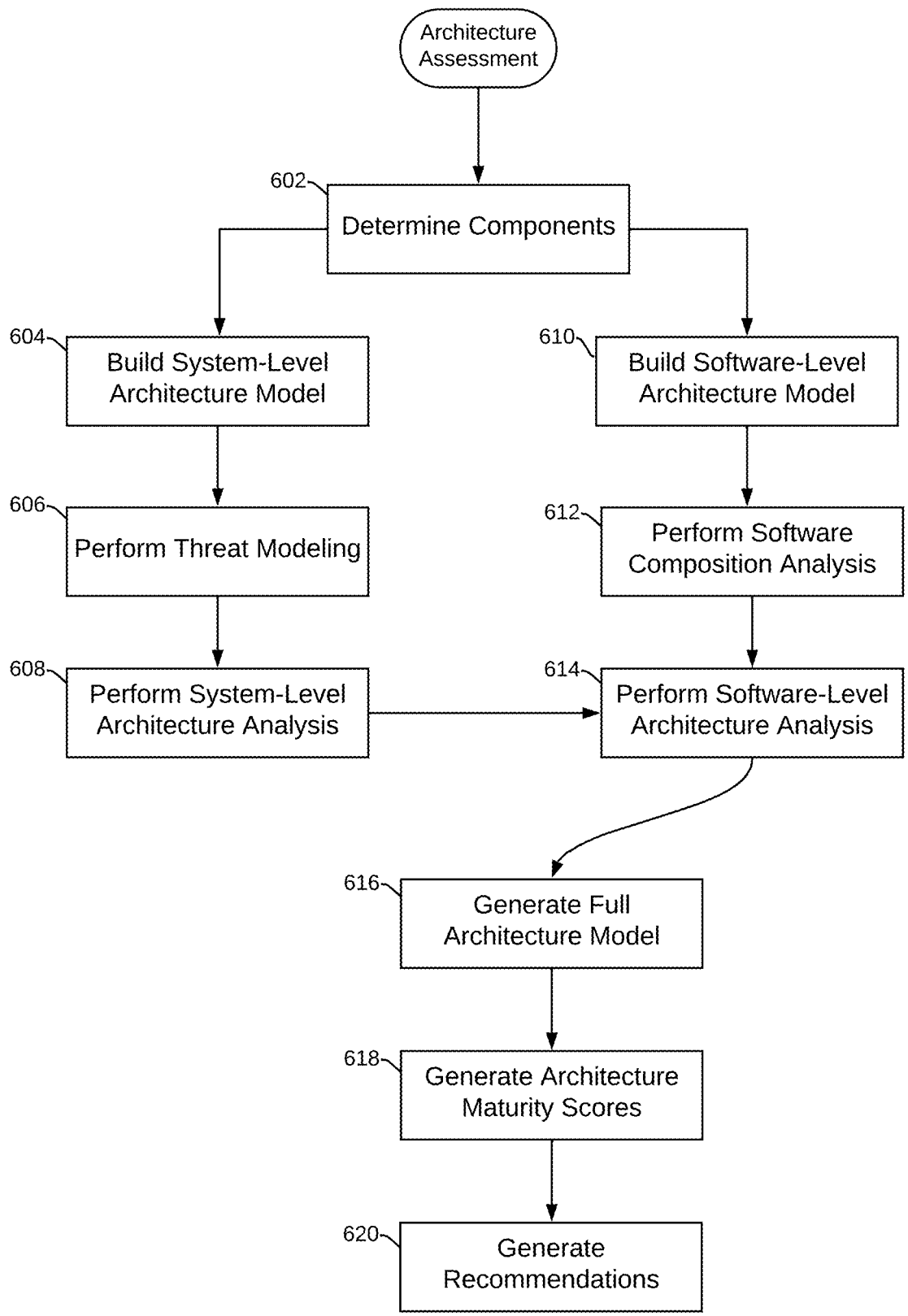
FIG. 6 is a flow chart illustrating a method for architecture assessment, one of the main subprocesses involved in testing and evaluating an IT product, in accordance with embodiments of the present application.

FIG. 6 shows a method of architecture assessment, one of the main subprocesses involved in testing and evaluating an IT product, in accordance with embodiments of the present application.

During the architecture assessment, the IT product's architecture and architectural design approach may be evaluated and measured at two different levels—the system level and the software level—to develop a picture of risk and risk mitigation.

Evaluating the architecture at the system level (e.g., a higher level than the software level) may refer to the high-level structure of a system that encompasses its components, the interactions between those components, and the infrastructure that supports those interactions. This architecture is designed to meet the system's requirements and goals, considering both functional and non-functional aspects. The concept applies across various domains, including software, hardware, networks, and more complex systems like those found in information technology, embedded systems, and enterprise architectures.

In some embodiments, the system level assessment takes the provider submitted architecture documentation as input along with interview sessions with individuals that possess knowledge about the system level architecture. The process uses a unique combination of COTS software, AI augmented review of documentation, and AI augmented interview-based discovery to establish the architecture of a system, including its data flows, system services, external dependencies, and other critical aspects of the system and its environment.

Evaluating the IT Product architecture at the software level may involve evaluating the design, interfaces, and components of the software itself. In some embodiments, software development artifacts may be used for evaluating architecture at the software level.

In some embodiments, interview-based analysis may be used to build a shared understanding of the system level architecture and/or the software level architecture.

The architecture assessment identifies the product components at the system and software levels that expose functionality, and the system services that underlie those functions. Service components are classified as composite or transparent. A composite service component requires some level of implementation in the software (e.g., encryption or input validation). A transparent service component requires no integration with the software; examples include firewall, transparent disk encryption, and physical security. The appropriate machine learning algorithm will be chosen based on the nature of the data and the classification task. The model will be trained on the labeled dataset so it can learn to differentiate between composite and transparent components to enable automated identification of service components and classification of their types. A confidence scoring mechanism will be implemented to assess the model's certainty in its classifications. This can help in identifying cases where human review might be necessary.

At block 602, the discovery process to identify components at both the system level and the software level may start. Examples of system level components may include infrastructure components used by the application, "one-hop" components, APIs, interfaces, security services including firewalls and intrusion protection systems, and so forth. Examples of software level components may include third-party components (e.g., libraries) and frameworks used by the IT product. In some embodiments, the discovery process may continue until block 616. In some embodiments, the discovery process may be a continuous, ongoing process.

In some embodiments, identifying the various components may involve reviewing software development artifacts and other materials submitted by the provider. For example, a software bill of materials (SBOM) may be reviewed to identify software level components.

In some embodiments, identifying the various components may involve conducting one or more architecture interviews with the provider to learn about the various components at the system level and/or the software level. More specifically, the interviews may be used to identify: each component; the data input/output by each component; and all the relationships, connections, and flows between the different components. Preparation for these interviews may involve reviewing documentation, materials (e.g., sales and marketing material), and other artifacts (e.g., any architecture diagrams) submitted by the provider, in order to help guide the discussion.

At block 604, once all the components at the system level are identified, a system-level architecture model may be built. In some embodiments, the system-level architecture model may be a high-level logical architecture diagram that illustrates the identified system-level components, the data flows between those components, trust zones, and so forth.

At block 606, threat modeling may be performed to identify risks to the architecture design of the IT product. In some embodiments, this may involve analyzing the system-level architecture model that was generated.

In some embodiments, AI may be used to assist in creating sophisticated threat models tailored to specific environments. By learning from past attacks and understanding the unique aspects of the system's architecture, AI can help in designing and validating against reference architectures that are more likely to be resistant to attacks and uncover real-world vulnerabilities that threats may attempt to exploit.

At block 608, analysis of the system-level architecture may be performed against the architecture maturity rubric designed to encourage more secure architectural patterns and maturity scores for the system level architecture. In some embodiments, these scores output from assessing the system level architecture according to the rubric may be used as part of the input for the software level architecture assessment (e.g., at block 614).

In some embodiments, a machine learning model may be used to analyze the system-level architecture and generate scores for the system-level architecture. In some embodiments, a machine learning model may be used to analyze the threat modeling sessions (e.g., from transcriptions of those sessions) and generate scores. For example, transcriptions of the threat modeling sessions may be collected along with a set of expert-annotated responses for reference. Using natural language processing (NLP), the transcriptions may be parsed to extract relevant content, focusing on the discussion of threat scenarios, mitigation strategies, and overall security posture. The data may then be cleaned to ensure accuracy and consistency before being provided as input to the machine learning model.

In some embodiments, the machine learning model may utilize a supervised learning approach and employ algorithms adept at text classification and sentiment analysis. In some embodiments, the machine learning model may be trained on a dataset of transcribed answers from architecture interviews with expert scores. The trained model may be able to score the threat modeling discussions based on criteria like the completeness of threat identification and the quality of proposed mitigation strategies. The trained model may be validated against manually scored transcriptions to ensure reliability. Once integrated into workflows, the trained model may offer automated, objective scoring of threat modeling sessions. In some embodiments, there may be a feedback mechanism for continuous improvement of the model, allowing the model to be adapted to evolving cybersecurity needs and communication styles while maintaining strict confidentiality and security protocols. This approach aims to enhance the assessment and improvement of a provider's cybersecurity and software design practices through detailed analysis of their threat modeling sessions.

Now turning back to the software level architecture assessment, which can be performed separately and/or concurrently as the system level architecture assessment—at block 610, once all the components at the software level are identified, a software-level architecture model may be built. In some embodiments, the software-level architecture model may be a high-level logical architecture diagram that illustrates the identified software-level components and their interfaces.

At block 612, software composition analysis may be performed. Software composition analysis may involve analysis of the various components of the software level architecture. Examples of the components review may include the third-party libraries and frameworks used by the software. This may also include reviewing any associated licenses, maintainers, and known vulnerabilities of those components. For example, an IT product may rely on an open source library, and the analysis may involve review of the library, its open source license, the maintainers of the library, and any known vulnerabilities associated with the library. In some embodiments, reliability scores may be generated for some security services based on the software composition analysis.

In some embodiments, the software composition analysis may analyze a Software Bill of Materials (SBOM). In some embodiments, the SBOM may be analyzed against vulnerability databases. In some embodiments, the provider may submit the SBOM in an approved format. In some embodiments, the SBOM may be enriched with data from trusted third parties. This may include descriptions of the software components, and NLP may be used to analyze for keywords that may indicate the use of the component in the software's service architecture. Each component may be tagged with one or more classifications, which can be reviewed and validated, thereby providing a feedback loop to improve the machine learning algorithm.

At block 614, software-level architecture analysis may be performed. In some embodiments, the software-level architecture may be analyzed using architectural analysis tools. For example, architecture analysis tools may be applied to components (e.g., codebases) of the software-level architecture and the results may be reviewed. In some embodiments, the software-level architecture may be analyzed through interviews. For example, assessors may conduct interviews with personnel associated with the provider to confirm the existence of security services.

In some embodiments, there may be a machine learning model to for analyzing the software-level architecture. For example, a machine learning model may be trained and configured to recognize various architectural patterns. In some embodiments, the machine learning model may be developed to recognize various software architectural patterns like wrapper, proxy, composite, prototype, and other common patterns. In some embodiments, the machine learning model may be trained and configured to classify the software architecture under various architectural patterns with the goal of understanding how well the architecture supports the designed security services, as well as others aspects.

At block 616, a full architecture model representing the identified components of the IT Product may be created. In some embodiments, the full architectural model may be a full logical diagram that contains all the components (e.g., software components, trust boundaries, and interfaces) identified in the system-level and software-level architectures. In some embodiments, the full architectural model may be in a standardized format, such as Unified Modeling Language.

Figure 7:
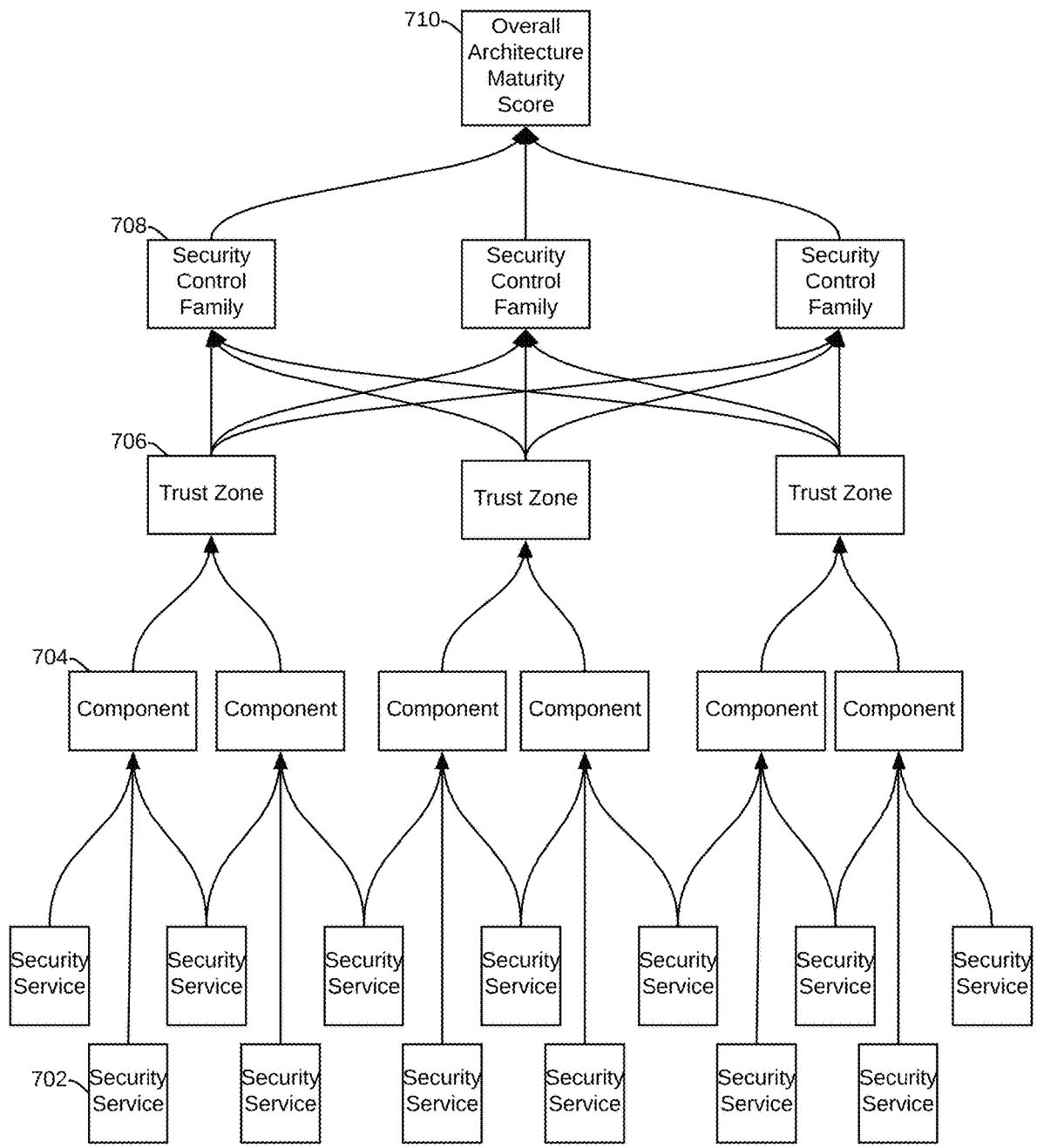
FIG. 7 illustrates multi-layer scoring associated with the overall architecture maturity score, in accordance with embodiments of the present application.

At block 618, one or more maturity scores for the product architecture may be generated. These architecture maturity scores may indicate how well the product's architecture is built to support each security service. In some embodiments, security services may be scored at each point of use (e.g., component, trust boundary, etc.) in the full architecture model. For example, there may be a plurality of security control families. Each of the security control families may be scored at the software and system levels against the architecture maturity rubric (e.g., for reliability, manageability, modularity, and isolation). A score is generated for each service relative to the point of use as identified earlier in the sub-process. In some embodiments, a master or overall architecture maturity score may be generated using a multi-layered analysis approach (e.g., as depicted in FIGS. 7 and 8).

It should be noted that these architecture maturity scores do not indicate the quality of the security services used, but rather how well the architecture is designed to accommodate changes without impacting the services used. In some embodiments, there may be an architecture maturity rubric that is used to generate the maturity scores. In some embodiments, there may be a separate maturity score for each of the control family. The architecture maturity rubric offers a means to provide a maturity score for each of control families.

At block 620, recommendations may be generated based on the outcomes of one or more of the steps outlined in FIG. 6. In some embodiments, these recommendations may be generated by a recommendations engine that is designed to enhance the architecture of the IT product by leveraging insights from the threat modeling and architecture review. The recommendation engine analyzes the outcomes of these reviews, focusing on identified weaknesses and potential threats.

In some embodiments, the recommendations engine may utilize machine learning and it may recognize patterns and vulnerabilities within the architecture, such as recurring security issues. The recommendations engine may then map these identified issues to a database of architectural best practices and solutions.

In some embodiments, the recommendations engine may be trained on a diverse range of architectural scenarios and their successful improvements. This training may be enriched by historical data and expert inputs, enabling the recommendations engine to adapt and refine its recommendations over time.

In some embodiments, there may be an interactive user interface that allows architects and developers to engage with the provided recommendations, understand the basis and reasoning for the recommendations, and submit feedback to further enhance the recommendations engine's accuracy and relevance. The recommendations engine may be designed to seamlessly integrate into existing software development workflows, promoting continuous architectural improvement.

FIG. 7 illustrates multi-layer scoring associated with the overall architecture maturity score, in accordance with embodiments of the present application.

In some embodiments, the full architecture model may include components and security services located in various trust zones. The security services may be associated with various points of use in the architecture; the security services may provide protection to elements of the architecture such as ports, security enclaves, interfaces, and components. In some embodiments, the security services may provide protection across a plurality of security control families (e.g., authorization, injection protection, etc.).

Accordingly, in some embodiments, maturity scores may be generated for the various security services 702, which may indicate the reliability and quality of each security service 702.

In some embodiments, a maturity score may be generated for each component 704 in the overall architecture. In some embodiments, the score for a particular component 704 may be based in part on the scores of the security services 702 associated with it (e.g., the security services that provide protection to that component 704). For example, scores for the security services 702 that protect a particular component 704 may be averaged and used to determine the score for that component 704.

In some embodiments, each trust zone 706 in the overall architecture may have one or more maturity scores associated with it. For example, a trust zone 706 may have numerous components 704 located within it, and those components 704 may be associated with one or more of the security control families 708. In some embodiments, there may be a maturity score that is generated for each component 704 in the trust zone 706.

In some embodiments, for a particular trust zone 706, a maturity score may be generated for each of the security control families 708 (e.g., based on the scores of the components 704 associated with each security control family 708). For example, if there are ten security control families 708, a particular trust zone 706 may have ten different scores for those ten security control families 708. In some embodiments, the scores for the components 704 associated with a particular security control family and trust zone 706 may be used to generate the respective security control family score for the trust zone 706. For example, the scores for the components 704 associated with a first security control family and located in a particular trust zone 706 may be averaged and used to determine the first security control family score for that trust zone 706.

In some embodiments, an aggregate score may be generated for each of the security control families 708. The aggregated score for a security control family may be based on the scores for the security control family across all the trust zones 706. For example, to obtain an aggregated score for a first security control family when there are seven trust zones 706, each trust zone may have a score for the first security control family that can be combined (e.g., seven in total). In some embodiments, the aggregate scores for all the security control families 708 may be combined into an overall architecture maturity score 710. For example, the aggregate scores for all the security control families 708 may be averaged into an overall architecture maturity score 710.

In some embodiments (not shown), an aggregate score may be generated for each trust zone 706. The aggregate score may be based on the security control family scores for the trust zone 706. For example, if there are ten security control families, then the ten corresponding security control family scores for the trust zone 706 may be averaged into an aggregate score for that trust zone 706. Accordingly, the aggregate score for a trust zone 706 may be indirectly based on the scores of the components 704 located in that trust zone 706 (and also the scores of the security services 702 associated with those components 704). In some embodiments, the aggregate scores for all the trust zones 706 may be combined into an overall architecture maturity score 710. For example, the aggregate scores for all the trust zones 706 may be averaged into an overall architecture maturity score 710.

FIG. 8 illustrates multi-layer scoring associated with the overall architecture maturity score, in accordance with embodiments of the present application.

More specifically, an example scoring table 800 is shown that lists out the subtotal or aggregate scores 804 for each of the security control families 802.

Also shown is an overall architecture maturity score 806, which in this case may be based on a combination of the aggregate scores 804 for the security control families 802.

Figure 9:
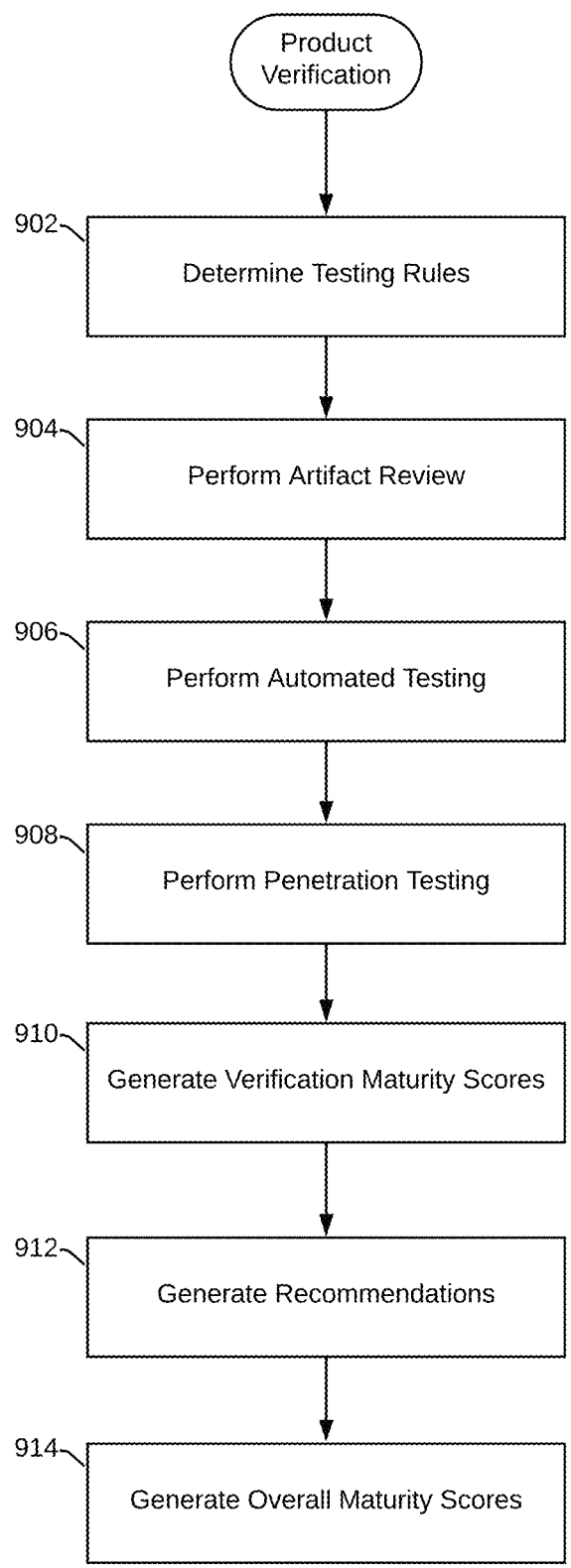
FIG. 9 is a flowchart illustrating a method for product verification, one of the main subprocesses involved in testing and evaluating an IT product, in accordance with embodiments of the present application.

FIG. 9 is a flowchart showing a process for product verification, which can be one of the main subprocesses involved in testing and evaluating an IT product, in accordance with embodiments of the present application.

In some embodiments, the product verification process is one of components or subprocesses for evaluating software and software updates. During the product verification subprocess, the IT product or software system may be tested against a set of requirements. In some embodiments, the tests may result in a set of verification maturity scores that can be used to assess the risk of changes in a particular IT product.

In some embodiments, the level of rigor of the tests may be based on the maturity scoring from the organization assessment and the architecture assessment subprocesses (e.g., FIG. 3 and FIG. 6). Understanding the organizational maturity and architecture maturity scores may allow the prescription of different levels of testing for software revisions. In some embodiments, certain types of changes to an IT product associated with higher organizational maturity scores and architecture maturity scores can be evaluated more quickly in subsequent iterations. For example, future evaluations of an IT product after a change to a single security service may be faster for a technology provider and IT product with higher organizational maturity scores and architecture maturity scores than lower scores. Examples of change types include, but are not limited to, changes to a graphical user interface, patches or other updates the underlying operating system supporting the IT product, and changes to one or multiple security services.

At block 902, testing rules for a test plan may be determined. For example, the test plan may have testing rules that indicate the scope of the testing (e.g., which components to test) and the level of testing rigor (e.g., full, basic, streamlined) to use for testing those components. In some embodiments, a set of change types may be established that will determine the level of rigor (full, basic, streamlined) for testing. In some embodiments, the testing regime for each change type may be adjusted based on the maturity scoring from the organizational assessment and the architecture assessment subprocesses. Accordingly, to perform the product verification assessment, an assessor may follow the testing techniques and rules specified in the test plan. In some embodiments, the testing rules may be determined/modified based on the results from the organizational assessment and the architecture assessment subprocesses.

In some embodiments, the software provider may optionally complete a series of product claims, the initial set of which is based on a plurality of control families. For each claim, the most efficient and effective testing method may be selected for assessing the conformance of that claim. Testing methods may be independent of, or may be specified by, but are not equivalent to, the required level of testing rigor.

At block 904, any artifacts submitted by the provider may be reviewed. Some examples of artifacts may include automated source code unit test results, automated vulnerability test results, automated configuration verification results, event audit logs, and third party analysis results (automated or manual). In some embodiments, the artifacts may need to be evaluated as "reliable" during the organizational assessment step (e.g., FIG. 3) to be used for product verification. In some embodiments, the artifact review may identify gaps or concerns in relevant controls based on the information provided. Each type of artifact will have various indicators of acceptability (e.g., as a determination of reliability) to be used in lieu of an assessor conducting testing.

At block 906, automated testing of the IT product may be performed in accordance with the testing plan. Automated testing is a broad type of testing that relies on testing software to perform test routines against the product or product component. Automated testing will execute the testing software against its target and produce results which will be evaluated by the assessor. The type of automated test will depend on the target. Types of automated testing may include configuration testing, vulnerability analysis (e.g., identifying, quantifying, and prioritizing the vulnerabilities in the software), source code analysis, accessibility testing, browser compatibility testing, and so forth.

In some embodiments, automated testing of the IT product may involve the use of a machine learning model. In some embodiments, the machine learning model may be trained on databases of known security defects and their indicators, allowing it to efficiently identify potential vulnerabilities and lack of controls in the IT product. In some embodiments, the machine learning model may be integrated into code scanning and analysis tooling via plugin or custom integration. In some embodiments, the machine learning model may be trained on positive security control indicators with a classification model to identify the existence and location of required security controls.

At block 908, penetration testing of the product may be performed. Penetration tests involve authorized attacks on the product, performed to evaluate its security and to find any security vulnerabilities that an attacker could exploit. The scope of a penetration test may be the provider's network, computer systems, hardware components, or IT product(s). Penetration testing may include any combination of manual and automated testing.

In some embodiments, penetration testing may involve AI-augmented penetration testing, designed to dynamically adapt attack strategies based on system responses. This can be achieved through one or more machine learning algorithms, such as reinforcement learning and a comprehensive dataset comprising various cyberattack scenarios. The system integrates with existing penetration testing tools, automating script generation and attack simulation. This approach can simulate more sophisticated cyber-attacks that adapt to the defenses they encounter. In addition to a full penetration testing option, the following web application penetration testing subtypes may be supported: configuration and deployment, identity management, authentication, authorization, session management, input validation, error handling, and cryptography. Limited penetration testing may be used if the changes do not warrant full penetration testing.

At block 910, a set of verification maturity scores may be generated based on the tests. The set of verification maturity scores may be used to assess the risk of changes in the IT product. Accordingly, the term verification maturity score may be a bit of a misnomer; the verification maturity score may actually be a risk score (e.g., associated with the severity and criticality of security issues), which may be understood by a person skilled in the art. In some embodiments, a machine learning model may be used to analyze the results of the testing and generate the verification maturity scores.

In some embodiments, for each security control family, there may be a set of verification maturity scores generated for each change type. For example, if there are ten different change types, then for a particular security control family (e.g., the "Authentication" security family), there may be ten verification maturity scores corresponding to the different change types. In some embodiments, the set of verification maturity scores for a particular security control family may be combined into an aggregated verification maturity score for the security control family. In some embodiments, the aggregated verification maturity scores for the security control families may be combined into an overall verification maturity score.

At block 912, recommendations may be generated (e.g., by a recommendations engine) for fixes related to any vulnerabilities found during the testing (e.g., during the product verification subprocess). In some embodiments, these recommendations will be fed into a report that can be sent to the provider that submitted the IT product.

At block 914, an overall maturity score may be generated that factors in the results of each of the organizational assessment, architecture assessment, and product verification subprocesses. For example, there may be a risk scoring algorithm that evaluates the severity and criticality of security issues, and there may also be a maturity scoring algorithm that assesses the robustness of software architecture and adherence to best practices. All of these factors may be combined into an overall maturity score that provides an overall assessment of the software's security posture.

In some embodiments, the overall maturity score may be generated by a machine learning model. In some embodiments, the machine learning model may integrate data from the penetration testing (e.g., from block 506), the architectural assessment (e.g., FIG. 4), and the organizational assessment (e.g., FIG. 3) to generate the overall maturity score (e.g., a comprehensive maturity and risk score for the IT product). In some embodiments, the machine learning model may employ a supervised learning approach, utilizing algorithms capable of handling complex data varieties, to extract critical risk and maturity indicators. Key inputs may include detailed findings from penetration tests, such as identified vulnerabilities. The model may be designed to continuously evolve, incorporating feedback and updated data to maintain relevance and accuracy.

Figure 10:
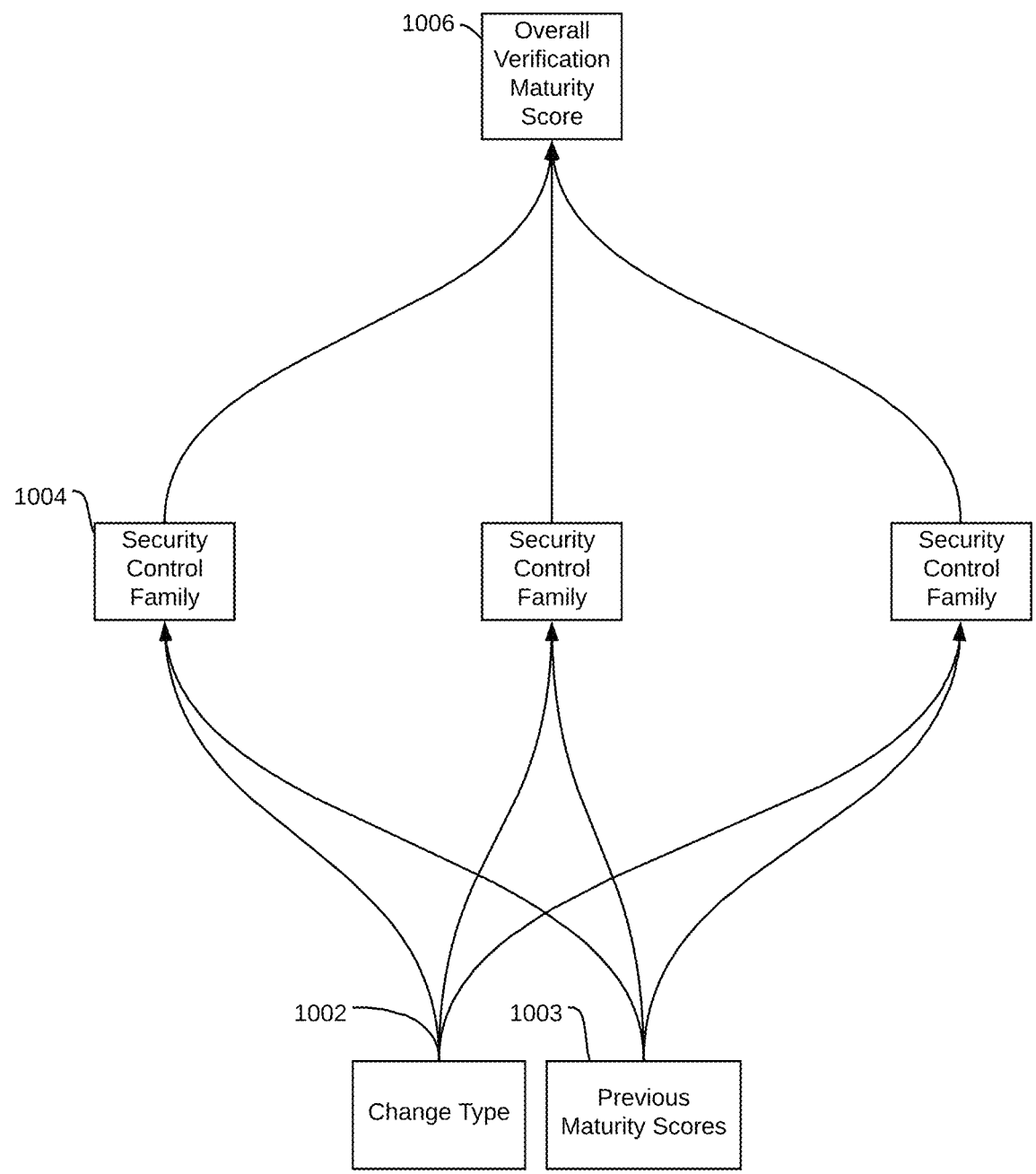
FIG. 10 illustrates multi-layer scoring associated with the overall verification maturity score, in accordance with embodiments of the present application.

FIG. 10 illustrates multi-layer scoring associated with the overall verification maturity score, in accordance with embodiments of the present application.

In some embodiments, automated testing and/or penetration testing may be performed in accordance with the test plan to evaluate the risk associated with different types of changes (e.g., change types) to the IT product. In some embodiments, the different types of changes may be evaluated within the context of a security control family.

In some embodiments, verification maturity scoring may involve change management. After the system receives an iteration submission (e.g., of the IT Product), all the changes to the IT Product may be determined (e.g., two security services were changed). A change type 1002 for the submission may be determined based on these changes to the IT Product; essentially, the extent of all these changes may be used to categorize the overall change to the IT Product.

In some embodiments, examples of different change types 1002 may include: other major or multiple change(s) to security service component(s); source code change to security service component(s); major configuration change to security service component(s); security patch of security service component(s); dependency updates for security service component(s); minor configuration change to security service component(s); source code change interfacing with security service component(s); source code change unrelated to security service component(s); third party software patch to a non-security service component(s); operating system patch; or other software or configuration change.

In some embodiments, the submission change type 1002, along with previous maturity scores 1003 (e.g., from the organization assessment and the architecture assessment), can be used to determine testing rigor for scoring each security control family 1004. For example, based on the change type 1002 and the previous maturity scores 1003 associated with the "Authentication" security control family, the testing rigor for that security control family may be adjusted, which may affect scoring. Examples of different levels of testing rigor may include streamlined (e.g., less rigorous), full (e.g., more rigorous), and basic (e.g., a level of rigor in-between).

However, in some embodiments, there may be change types 1002 that are applicable to particular security control families 1004 and also change types 1002 that are not applicable to particular security control families 1004. For example, if there is a change made that is associated with the "Authentication" security control family, it would not affect the "Boundary Protection" security control family.

To put it in other words, there may be a set of security control families 1004. For each security control family 1004, a change type 1002 may be established and used to conduct testing that results in a set of verification maturity scores for each security control family 1004. More specifically, an overall change type 1002 is determined for the new version/submission of the IT product based on the changes (e.g., "this version has changes to multiple security services"), which can drive the required testing for each security control family.

For example, if there are ten security control families 1004, there may be ten verification maturity scores corresponding determined by testing performed in accordance with the test plan. In some embodiments, the set of verification maturity scores for a particular security control family 1004 may be combined into an aggregated verification maturity score for the security control family 1004.

In some embodiments, the aggregated verification maturity scores for the security control families 1004 may be combined into an overall verification maturity score 1006.

Figure 11:
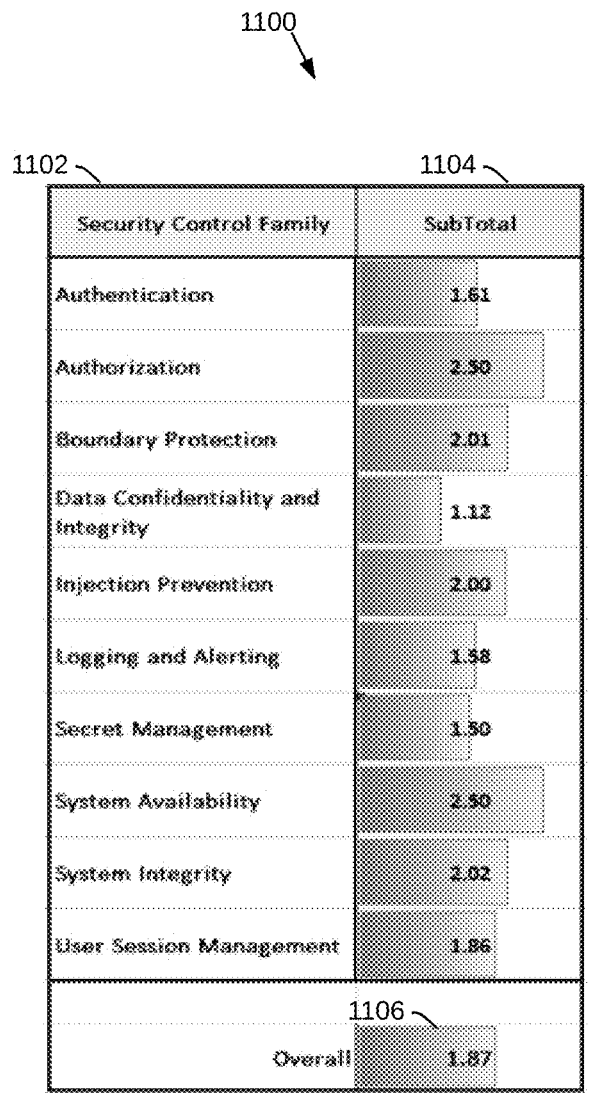
FIG. 11 illustrates multi-layer scoring associated with the overall verification maturity score, in accordance with embodiments of the present application.

FIG. 11 illustrates multi-layer scoring associated with the overall verification maturity score, in accordance with embodiments of the present application.

More specifically, an example scoring table 1100 is shown that lists out the subtotal or aggregate verification maturity scores 1104 for each of the security control families 1102.

Also shown is an overall verification maturity score 1106, which in this case may be based on a combination of the aggregate verification maturity scores 1104 for the security control families 1102.

Figure 12:
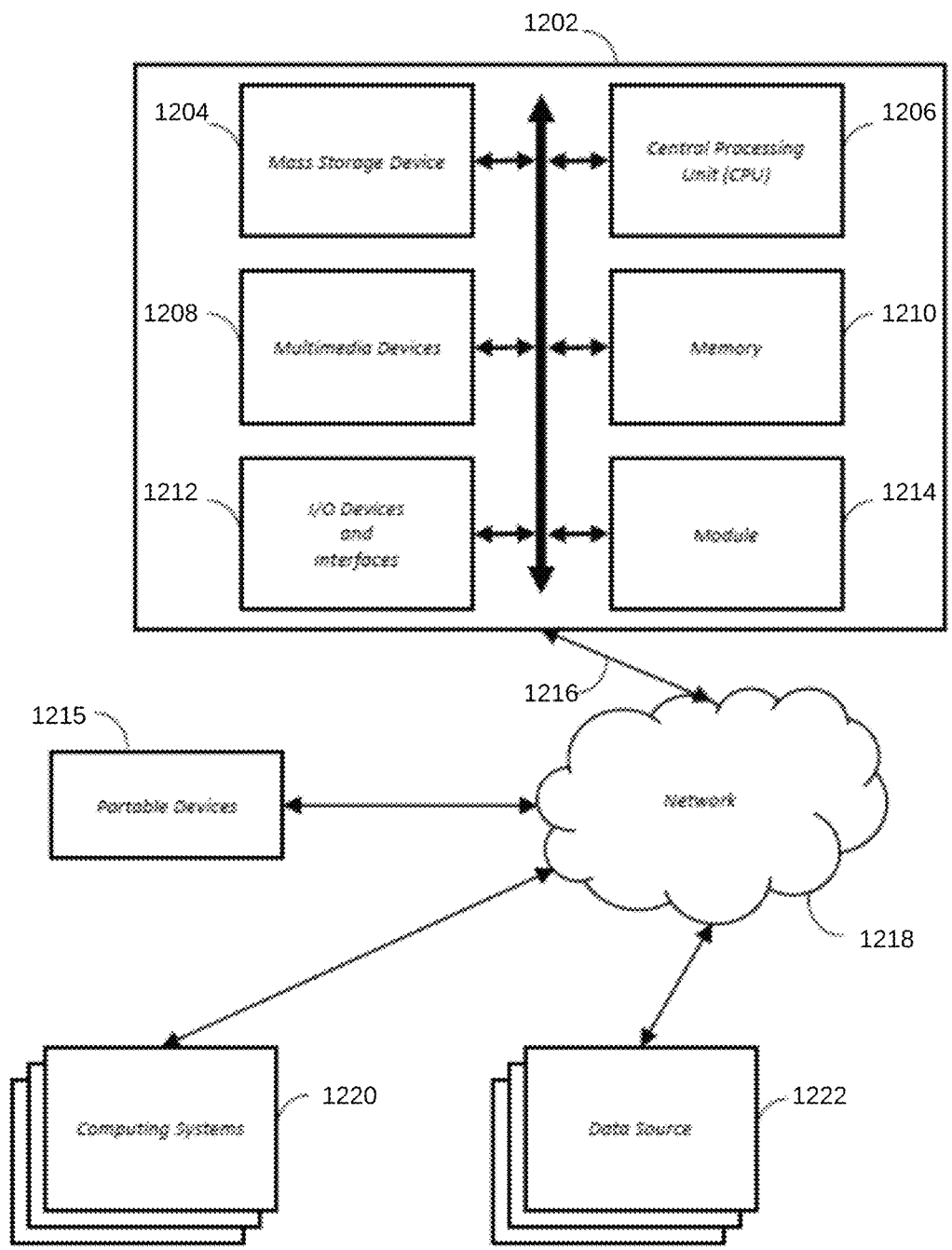
FIG. 12 is a block diagram depicting an embodiment of a computer hardware system configured to run software for implementing one or more embodiments disclosed herein.

FIG. 12—Computer Systems

FIG. 12 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 12. The example computer system 1202 is in communication with one or more computing systems 1220 and/or one or more data sources 1222 via one or more networks 1218. While FIG. 12 illustrates an embodiment of a computing system 1202, it is recognized that the functionality provided for in the components and modules of computer system 1202 may be combined into fewer components and modules, or further separated into additional components and modules.

The computer system 1202 can comprise a module 1214 that carries out the functions, methods, acts, and/or processes described herein. The module 1214 is executed on the computer system 1202 by a central processing unit 1206 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1202 includes one or more processing units (CPU) 1206, which may comprise a microprocessor. The computer system 1202 further includes a physical memory 1210, such as random-access memory (RAM) for temporary storage of information, a read only memory (ROM) for permanent storage of information, and a mass storage device 1204, such as a backing store, hard drive, rotating magnetic disks, solid state disks (SSD), flash memory, phase-change memory (PCM), 3D xPoint memory, diskette, or optical media storage device. Alternatively, the mass storage device may be implemented in an array of servers. Typically, the components of the computer system 1202 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1202 includes one or more input/output (I/O) devices and interfaces 1212, such as a keyboard, mouse, touch pad, and printer. The I/O devices and interfaces 1212 can include one or more display devices, such as a monitor, that allows the visual presentation of data to a user. More particularly, a display device provides for the presentation of GUIs as application software data, and multi-media presentations, for example. The I/O devices and interfaces 1212 can also provide a communications interface to various external devices. The computer system 1202 may comprise one or more multi-media devices 1208, such as speakers, video cards, graphics accelerators, and microphones, for example.

The computer system 1202 may run on a variety of computing devices, such as a server, a Windows server, a Structure Query Language server, a Unix Server, a personal computer, a laptop computer, and so forth. In other embodiments, the computer system 1202 may run on a cluster computer system, a mainframe computer system and/or other computing system suitable for controlling and/or communicating with large databases, performing high volume transaction processing, and generating reports from large databases. The computing system 1202 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 1202 illustrated in FIG. 12 is coupled to a network 1218, such as a LAN, WAN, or the Internet via a communication link 1216 (wired, wireless, or a combination thereof). Network 1218 communicates with various computing devices and/or other electronic devices. Network 1218 is communicating with one or more computing systems 1220 and one or more data sources 1222. The module 1214 may access or may be accessed by computing systems 1220 and/or data sources 1222 through a web-enabled user access point. Connections may be a direct physical connection, a virtual connection, and other connection types. The web-enabled user access point may comprise a browser module that uses text, graphics, audio, video, and other media to present data and to allow interaction with data via the network 1218.

Access to the module 1214 of the computer system 1202 by computing systems 1220 and/or by data sources 1222 may be through a web-enabled user access point such as the computing systems' 1220 or data source's 1222 personal computer, cellular phone, smartphone, laptop, tablet computer, e-reader device, audio player, or another device capable of connecting to the network 1218. Such a device may have a browser module that is implemented as a module that uses text, graphics, audio, video, and other media to present data and to allow interaction with data via the network 1218.

The output module may be implemented as a combination of an all-points addressable display such as a cathode ray tube (CRT), a liquid crystal display (LCD), a plasma display, or other types and/or combinations of displays. The output module may be implemented to communicate with input devices 1212 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 1202 may comprise a physical or logical connection established between a remote microprocessor and a mainframe host computer for the express purpose of uploading, downloading, or viewing interactive data and databases on-line in real time. The remote microprocessor may be operated by an entity operating the computer system 1202, including the client server systems or the main server system, an/or may be operated by one or more of the data sources 1222 and/or one or more of the computing systems 1220. In some embodiments, terminal emulation software may be used on the microprocessor for participating in the micro-mainframe link.

In some embodiments, computing systems 1220 who are internal to an entity operating the computer system 1202 may access the module 1214 internally as an application or process run by the CPU 1206.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1202 may include one or more internal and/or external data sources (for example, data sources 1222). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cachd), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 1202 may also access one or more databases 1222. The databases 1222 may be stored in a database or data repository. The computer system 1202 may access the one or more databases 1222 through a network 1218 or may directly access the database or data repository through I/O devices and interfaces 1212. The data repository storing the one or more databases 1222 may reside within the computer system 1202.

ADDITIONAL EMBODIMENTS

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single IT product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

The invention claimed is:

1. A computer-implemented method for evaluating and scoring an IT product of a technology provider, the method comprising:
   receiving a submission package from the technology provider, wherein the submission package comprises an artifact associated with development of the IT product;
   processing a set of organizational interview transcripts containing discussions of development lifecycle processes;
   generating a set of organizational maturity scores based on the set of organizational interview transcripts and the artifact;
   processing a full architectural model comprising system-level components and software-level components associated with the IT product;
   generating a set of architecture maturity scores based on the full architectural model;
   performing manual or automated testing of the IT product;
   performing penetration testing of the IT product;
   generating a set of verification maturity scores based on the penetration testing; and
   combining the set of organizational maturity scores, the set of architecture maturity scores, and the set of verification maturity scores into an overall maturity score.

2. The computer-implemented method of claim 1, further comprising:
   assessing risk associated with the IT product based on the set of organizational maturity scores, the set of architecture maturity scores, the set of verification maturity scores, and the overall maturity score.

3. The computer-implemented method of claim 1, wherein the set of organizational maturity scores, the set of architecture maturity scores, the set of verification maturity scores, and the overall maturity score are used to inform and expedite testing of future iterations of the IT product.

4. The computer-implemented method of claim 1, wherein the set of organizational maturity scores are generated by a machine learning model.

5. The computer-implemented method of claim 1, wherein the set of architecture maturity scores are generated by a machine learning model.

6. The computer-implemented method of claim 1, wherein the set of verification maturity scores are generated by a machine learning model.

7. A non-transient computer readable medium containing program instructions for causing a computer system to perform the steps of:
   receiving a submission package from the technology provider, wherein the submission package comprises an artifact associated with development of the IT product;
   processing a set of organizational interview transcripts containing discussions of development lifecycle processes;
   generating a set of organizational maturity scores based on the set of organizational interview transcripts and the artifact;
   processing a full architectural model comprising system-level components and software-level components associated with the IT product;
   generating a set of architecture maturity scores based on the full architectural model;
   performing manual or automated testing of the IT product;
   performing penetration testing of the IT product;
   generating a set of verification maturity scores based on the penetration testing; and
   combining the set of organizational maturity scores, the set of architecture maturity scores, and the set of verification maturity scores into an overall maturity score.

8. The non-transient computer readable medium of claim 7, wherein the program instructions further cause the computer system to perform the step of:
   assessing risk associated with the IT product based on the set of organizational maturity scores, the set of architecture maturity scores, the set of verification maturity scores, and the overall maturity score.

9. The non-transient computer readable medium of claim 7, wherein the set of organizational maturity scores, the set of architecture maturity scores, the set of verification maturity scores, and the overall maturity score are used to inform and expedite testing of future iterations of the IT product.

10. The non-transient computer readable medium of claim 7, wherein the set of organizational maturity scores are generated by a machine learning model.

11. The non-transient computer readable medium of claim 7, wherein the set of architecture maturity scores are generated by a machine learning model.

12. The non-transient computer readable medium of claim 7, wherein the set of verification maturity scores are generated by a machine learning model.

13. The computer-implemented method of claim 1, wherein the artifact is produced during development of the IT product.

14. The computer-implemented method of claim 1, further comprising: storing the overall maturity score in a historical assessment database.

15. The computer-implemented method of claim 1, further comprising: generating a report containing the overall maturity score.

16. The non-transient computer readable medium of claim 7, wherein the artifact is produced during development of the IT product.

17. The non-transient computer readable medium of claim 7, wherein the program instructions further cause the computer system to perform the step of:

storing the overall maturity score in a historical assessment database.

18. The non-transient computer readable medium of claim 7, wherein the program instructions further cause the computer system to perform the step of: generating a report containing the overall maturity score.

* * * * *